US010021158B2

(12) United States Patent
Seol et al.

(10) Patent No.: US 10,021,158 B2
(45) Date of Patent: Jul. 10, 2018

(54) CONVERTING DATA STREAM IN USER EQUIPMENT

(71) Applicant: KT CORPORATION, Gyeonggi-do (KR)

(72) Inventors: Soon-Uk Seol, Daejeon (KR); Seung-Jae Lee, Daejeon (KR)

(73) Assignee: KT CORPORATION, Gyeonggi-do (KR)

( * ) Notice: Subject to any disclaimer, the term of this patent is extended or adjusted under 35 U.S.C. 154(b) by 181 days.

(21) Appl. No.: 13/739,807

(22) Filed: Jan. 11, 2013

(65) Prior Publication Data

US 2013/0179546 A1    Jul. 11, 2013

(30) Foreign Application Priority Data

Jan. 11, 2012   (KR) .................. 10-2012-0003368

(51) Int. Cl.
*G06F 15/16*   (2006.01)
*H04L 29/06*   (2006.01)

(52) U.S. Cl.
CPC ........ *H04L 65/601* (2013.01); *H04L 65/4084* (2013.01); *H04L 65/604* (2013.01)

(58) Field of Classification Search
CPC ............... H04N 21/43; H04N 21/8456; H04N 21/6125; H04N 21/23439; H04N 21/2381; H04N 21/2387; H04N 21/6175; H04L 29/06027; H04L 65/604; H04L 67/02; H04L 69/22; H04L 65/4076; H04L 65/608; H04L 65/4084; H04L 65/4069; H04L 65/601; H04L 65/607; G06F 17/30058; G06F 17/30861
(Continued)

(56) References Cited

U.S. PATENT DOCUMENTS 7,467,211 B1 * 12/2008 Herman et al. ............... 709/229
7,822,428 B1 * 10/2010 Morris et al. ................. 455/508
(Continued)

FOREIGN PATENT DOCUMENTS

KR   10-2006-0012510 A    2/2006
KR   10-2008-0095429 A   10/2008
(Continued)

*Primary Examiner* — Joseph E Avellino
*Assistant Examiner* — Rachel J Hackenberg
(74) *Attorney, Agent, or Firm* — IP Legal Services, LLC

(57) ABSTRACT

Described embodiments provide user equipment for converting a first type data stream to a second type data stream. The user equipment may include a request message transmitting unit, a first stream receiving unit, a converting unit, and a reproducing unit. The request message transmitting unit may transmit a content request message to a streaming server in order to request a predetermined content stored in the streaming server. The first stream receiving unit may receive, from the streaming server, a first type data stream created from the requested content based on a first protocol in response to the content request message. The converting unit may convert the received first type data stream to a second type data stream. The second type data stream may be a data stream generated based on a second protocol. The reproducing unit may reproduce the requested content based on the second type data stream.

20 Claims, 5 Drawing Sheets

(58) Field of Classification Search
USPC .......................................................... 709/219
See application file for complete search history.

(56) References Cited

U.S. PATENT DOCUMENTS

| | | | |
|---|---|---|---|
| 8,839,313 B2* | 9/2014 | Higgins et al. | 725/80 |
| 2009/0031376 A1* | 1/2009 | Riley | H04N 21/84 |
| | | | 725/105 |
| 2009/0208006 A1* | 8/2009 | Candelore | 380/200 |
| 2009/0249419 A1* | 10/2009 | Kahn et al. | 725/115 |
| 2011/0029768 A1 | 2/2011 | Nam et al. | |
| 2011/0182561 A1 | 7/2011 | Bae | |
| 2011/0302319 A1* | 12/2011 | Ha | H04N 21/23439 |
| | | | 709/231 |
| 2012/0011233 A1* | 1/2012 | Dixon | H04L 12/2827 |
| | | | 709/221 |
| 2012/0163771 A1* | 6/2012 | Li | 386/241 |
| 2013/0007830 A1* | 1/2013 | Klappert et al. | 725/116 |
| 2014/0325158 A1* | 10/2014 | Aronovich et al. | 711/130 |

FOREIGN PATENT DOCUMENTS

| | | |
|---|---|---|
| KR | 10-2009-0019659 A | 2/2009 |
| KR | 10-2010-0002536 A | 1/2010 |
| KR | 10-2010-0108090 A | 10/2010 |
| KR | 10-2011-0100534 A | 9/2011 |

* cited by examiner

CONVERTING DATA STREAM IN USER EQUIPMENT

CROSS REFERENCE TO PRIOR APPLICATIONS

The present application claims priority under 35 U.S.C. § 119 to Korean Patent Application No. 10-2012-0003368 (filed on Jan. 11, 2012), which is hereby incorporated by reference in its entirety.

FIELD OF THE INVENTION

The present invention relates to user equipment and, in particular, to converting a data stream type in user equipment.

BACKGROUND OF THE INVENTION

Due to the advanced technologies for communication networks and mobile devices, various services have been introduced to maximize utilization of the mobile device and the communication network. For example, an N-screen service has been introduced. Such an N-screen service may enable a user to seamlessly receive and reproduce multimedia contents through multiple user devices such as a personal computer (PC), a smart phone, a tablet PC, a pad-type device, and a television set. The N-screen service may require technologies for reproducing the same contents through multiple devices at the same time and for seamlessly reproducing certain content through multiple devices.

Such introduced services make it popular to download a data stream of multimedia contents (i.e., movies) from a streaming server and playback the multimedia contents by reproducing the downloaded data stream through various types of portable devices. Since the data stream might be generated in various methods, user equipment may receive unsupported data stream from a streaming server.

SUMMARY OF THE INVENTION

This summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments of the present invention overcome the above disadvantages and other disadvantages not described above. Also, the present invention is not required to overcome the disadvantages described above, and an embodiment of the present invention may not overcome any of the problems described above.

In accordance with an aspect of the present invention, a first type data stream may be converted to a second type data stream in user equipment.

In accordance with another aspect of the present invention, user equipment may receive an unsupported data stream from a streaming server, convert the unsupported data stream to a supported data stream, and reproduce a predetermined content based on the converted data stream.

In accordance with at least one embodiment of the present invention, a user equipment may be provided for converting a first type data stream to a second type data stream. The user equipment may include a request message transmitting unit, a first stream receiving unit, a converting unit, and a reproducing unit. The request message transmitting unit may be configured to transmit a content request message to a streaming server in order to request a predetermined content stored in the streaming server. The first stream receiving unit may be configured to receive, from the streaming server, a first type data stream created from the requested content based on a first protocol in response to the content request message. The converting unit may be configured to convert the received first type data stream to a second type data stream. The second type data stream may be a data stream generated based on a second protocol. The reproducing unit may be configured to reproduce the requested content based on the second type data stream.

The converting unit may include a segmentation unit, a security setting release unit, and a second stream file generating unit. The segmentation unit may be configured to generate a plurality of first stream files by segmenting the received first type data stream in a predetermined time unit. The predetermined time unit may be decided based on the second protocol. The security setting release unit may be configured to release security setting of the plurality of the first stream files. The second stream file generating unit may be configured to generate a plurality of second stream files based on the plurality of first stream files with the security setting released. The second stream files may be included in the second type data stream.

The user equipment may further include a database. The database may be configured to store the plurality of second stream files. In this case, the reproducing unit may be configured to reproduce the requested contents based on the plurality of second stream files stored in the database.

The converting unit may further include an index file processing unit configured to generate an index file of the plurality of second stream files. In this case, the user equipment may further include a database configured to store the plurality of second stream files and the index file and the reproducing unit may be configured to reproduce the requested content based on the plurality of second stream files and the index file stored in the data base. The index file may include a reproducing order of the plurality of second stream files.

The request message transmitting unit may be configured to transmit to the streaming server the content request message including information on a playback point of the requested content. The first stream receiving unit may be configured to receive from the streaming server the first type data stream corresponding to the playback point included in the content request message.

The request message transmitting unit may be configured to receive a user input for changing a playback point from a user through a user interface while reproducing the requested content through the reproducing unit and to transmit a playback point change request message to the streaming server for requesting the streaming server to transmit the first type data stream from a changed playback point. The first stream receiving unit may be configured to receive from the streaming server the first type data stream from the changed playback point. The converting unit may be configured to convert the received first type data stream to the second type data stream. In this case, the converting unit may include a segmentation unit configured to generate a plurality of first stream files by segmenting the received first type data stream in a predetermined time unit, wherein the predetermined time unit is decided based on the second protocol, a security setting release unit configured to release security setting of the plurality of first stream files, a second stream file generating unit configured to generate a plurality of second stream files based on the plurality of first stream files with the security setting released, and an index file processing unit configured to update an index file of the plurality of second stream files based on the changed playback point.

The request message transmitting unit may be configured to obtain a position of a playback point cursor on a playback bar upon the receipt of the user input for moving the playback point cursor through a user interface while reproducing the requested content through the reproducing unit, to calculate a ratio of the obtained position and an end point of the playback bar, to determine a playback point of the moved playback point cursor based on the calculated ratio, to generate the playback point change request message based on the determined playback point, and to transmit the generated playback point change request message to the streaming server.

The first protocol may be a file transfer protocol (FTP) and the first type data stream may be a FTP stream. Furthermore, the second protocol may be a hypertext transfer protocol (HTTP) and the second type data stream may be a HTTP live streaming (HLS) data stream.

The request message transmitting unit may be configured to transmit a content request message for requesting a first type data stream created from the requested content based on a first protocol.

The request message transmitting unit may be configured to transmit the content request message when receiving a user selection input for selecting the requested content through a user interface. The first type data stream may be a data stream processed based on a predetermined security scheme and the second type data stream may be a data stream not processed based on the predetermined security scheme. The predetermined security scheme may be at least one of digital right management (DRM) schemes.

In accordance with another embodiment of the present invention, a method may be provided for converting a first type data stream to a second type data stream in a user equipment. The method may include generating a content request message for requesting a content, transmitting the generated content request message to the streaming server, receiving from the streaming server a first type data stream generated from the requested content based on a first protocol, converting the received first type data stream to a second type data stream based on a second protocol, and reproducing the requested content based on the second type data stream.

The converting may include generating a plurality of first stream files by segmenting the received first type data stream in a predetermined time unit, wherein the predetermined time unit is decided based on the second protocol, releasing security setting of the plurality of the first stream files, and generating a plurality of second stream files based on the plurality of first stream files with the security setting released.

In accordance with another embodiment of the present invention, a streaming server may be provided for transmitting a data stream of a requested content to a user equipment. The streaming server may include a request message receiving unit, a first stream receiving unit, a first stream generating unit, and a first stream transmitting unit. The request message receiving unit may be configured to receive a content request message from a user equipment. The first stream generating unit may be configured to generate a first type data stream from requested content of the content request message based on a first protocol. The first stream transmitting unit may be configured to transmit the generated first type data stream to the user equipment. The first type data stream may be converted to a second type data stream based on a second protocol in the user equipment.

The streaming server may further include a security setup unit configured to process at least one of the requested content and the first type data stream according to a predetermined security scheme.

The request message receiving unit may be configured to receive a playback point change request message from the user equipment. The playback point change request message includes information on a playback point. The first stream generating unit may be configured to generate the first type data stream based on the information on the playback point included in the playback point change request message.

BRIEF DESCRIPTION OF THE DRAWINGS

The above and/or other aspects of the present invention will become apparent and more readily appreciated from the following description of embodiments, taken in conjunction with the accompanying drawings, of which.

DETAILED DESCRIPTION OF THE INVENTION

Figure 1:
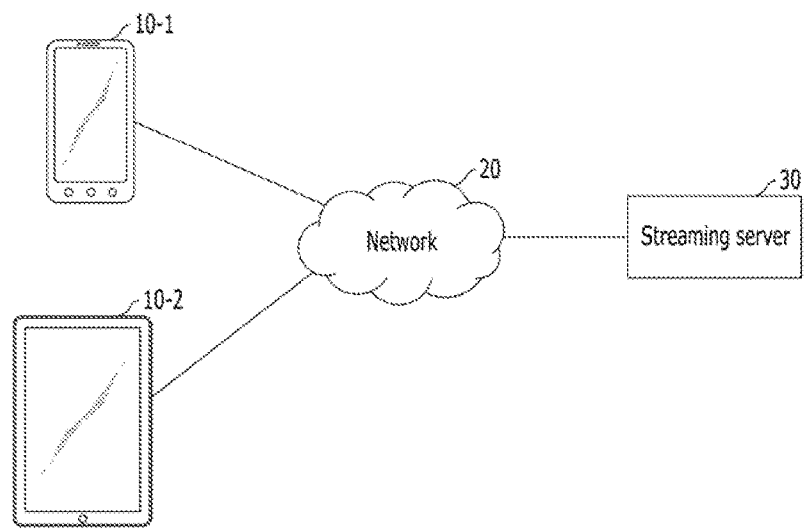
FIG. 1 shows user equipment and a streaming server in accordance with at least one embodiment of the present invention.

Reference will now be made in detail to embodiments of the present invention, examples of which are illustrated in the accompanying drawings, wherein like reference numerals refer to like elements throughout. The embodiments are described below, in order to explain the present invention by referring to the figures.

In accordance with at least one embodiment of the present invention, user equipment may receive a data stream from a streaming server. When the received data stream is unsupported for reproduction (i.e., play back), user equipment may convert the received data stream into a supported data stream. Such operation of user equipment and the streaming server will be briefly described with reference to FIG. 1.

FIG. 1 shows user equipment and a streaming server in accordance with at least one embodiment of the present invention.

Referring to FIG. 1, at least one user equipment 10-1 and 10-2 may be coupled to streaming server 30 through network 20. Such user equipment 10-1 and 10-2 may be a pad-type portable device and a smart phone, but the present invention is not limited thereto. Streaming server 30 may be a server, such as a computer with a relatively large hard drive, which provides a streaming service. That is, streaming server 30 may provide a list of contents stored therein to a user through user equipment and enable the user to select one of the contents in the provided list. Such contents may include various types of data, for example, movies, songs, data, games, and so forth. In response to the user selection, streaming server 30 may stream data of the selected contents to the user equipment. Such streaming may be a sequence of data elements made available over time. For example, streaming server 30 may deliver data of a selected movie to the user equipment and the user equipment may play back the data of the selected movie while receiving the data from streaming server 30. Furthermore, streaming server 30 is illustrated as single server in FIG. 1, but the present invention is not limited thereto. Streaming server 30 may include other types of servers such as a web-server, a database server, and/or a media server. Such functions and operations of streaming server 30 will be described subsequently in more detail.

Such streaming server 30 may be coupled with at least one user equipment 10 -1 and 10-2 through network 20. Particularly, streaming server 30 may exchange data with coupled user equipment 10-1 and 10-2 through network 20. For example, network 20 may be at least one of a local area network (LAN), a wireless LAN, a wide area network (WAN), a personal area network (PAN), and a mobile radio communication network, but the present invention is not limited thereto.

User equipment 10-1 and 10-2 may be a portable device that is capable of communicating with a server located at a remote location. For example, user equipment 10-1 and 10-2 may be a personal communication system (PCS), a global system for mobile communication (GSM) device, a personal digital cellular (PDC) device, a personal handy-phone system (PHS), a personal digital assistant (PDA), an international mobile telecommunication (IMT)-2000 device, a code division multiple Access (CDMA)-2000 device, wideband code division multiple access (WCDMA) device, a wireless broadband internet (WiBro) device, a smart phone, and so forth. The present invention, however, is not limited thereto. Such user equipment 10-1 and 10-2 may include various types of handheld devices capable of communicating with other entity. Furthermore, user equipment 10-1 and 10-2 may include devices coupled to streaming server 30 through network 20. For example, user equipment 10-1 and 10-2 may be an IPTV set-top box or a personal computer (PC). For convenience and ease of understanding, user equipment 10-1 will be representatively described hereinafter. However, user equipment 10-2 may have similar functions and perform similar operations of user equipment 10-1.

In accordance with at least one embodiment of the present invention, user equipment 10-1 may receive a data stream from streaming server 30 and reproduce the received data stream. Such data stream may be multimedia data stream, but the present invention is not limited thereto. In order to receive and reproduce, user equipment 10-1 may transmit a contents request message to streaming server 30. For example, streaming server 30 may provide a list of contents stored therein to user equipment 10-1. User equipment 10-1 may provide the received content list to a user through a related user interface. User equipment 10-1 may receive a selection signal from the user for selecting at least one content entry from the provided content list through the user interface of user equipment 10-1. Upon the receipt of the selection signal, user equipment 10-1 may transmit a content request message to streaming server 30 to request the selected content.

Such a content request message may include information on a playback point of the selected content. The playback point of the selected content may be a start position of the selected content for playing back the selected content. For example, a user may want to play back the selected content from a certain point. When the selected content is a movie, a user may want to start playing back the selected movie from a certain scene of the selected movie rather than a first scene of the selected movie. The content request message may include information on a playback point of the selected content.

User equipment 10-1 may receive a data stream of the selected content from streaming server 300 in response to the content request message. Such data stream may be formed in a format unsupported by user equipment 10-1. That is, the received data stream may be a data stream in a format that cannot be reproduced in user equipment 10-1 (an "irreproducible data stream"). In accordance with at least one embodiment of the present invention, user equipment 10-1 may convert such an irreproducible data stream to a reproducible data stream. For example, user equipment 10 may receive a first type data stream created based on a first protocol from streaming server 30. When such a first type data stream is not reproducible in user equipment 10-1, user equipment 10-1 may convert the received first type data stream to a second type data stream created based on a second protocol, which is reproducible in user equipment 10-1. For example, the first protocol may be a file transfer protocol (FTP) and the first type data stream may be a FTP data stream. The second protocol may be a hypertext transfer protocol (HTTP) and the second type data stream may be a HTTP Live stream (HLS).

After converting, user equipment 10-1 may reproduce the second type data stream. For example, user equipment 10-1 may store second stream files which are segments of the second type data stream and play back the selected content based on the stored second stream files. Accordingly, user equipment 10-1 may convert the unsupported data stream into a supported data stream and play back the selected contents based on the converted data stream without requesting streaming server 30 to retransmit the supported data stream in accordance with at least one embodiment of the present invention. Such an operation of user equipment 10-1 will be described in detail with reference to FIG. 2.

Figure 2:
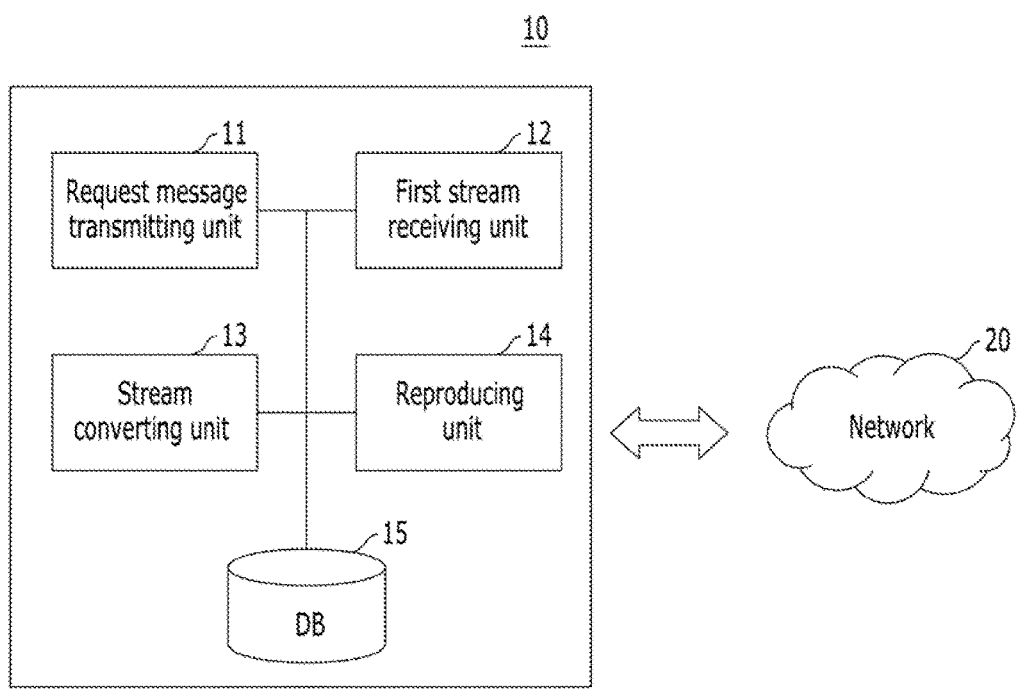
FIG. 2 shows user equipment in accordance with at least one embodiment of the present invention.

FIG. 2 shows user equipment in accordance with at least one embodiment of the present invention.

Referring to FIG. 2, user equipment 10-1 may include request message transmitting unit 11, first stream receiving unit 12, stream converting unit 13, reproducing unit 14, and database (DB) 15.

Request message transmitting unit 11 may transmit a content request message to streaming server 30 for requesting various types of content. When user equipment 10-1 receives a selection input from a user through a user interface for selecting contents to be reproduced, request message transmitting unit 11 may transmit such a content request message to streaming server 30. For example, request message transmitting unit 11 may transmit a content request message for requesting a first type data stream corresponding to the selected contents to streaming server 30. The first type data stream may be created based on a first protocol. Furthermore, the content request message may include information on a playback point of selected contents. In response to the content request message, streaming server 30 may provide a first type data stream from the playback point included in the content response message. Such playback point may be a start point of reproducing the selected contents. Such start point may be the beginning of the selected content or the middle of the selected content. For example, when the selected content has been previously reproduced and stopped at the middle of the selected content, the playback point may be the stopped point of the selected content, which might be a certain middle part of the selected content.

First stream receiving unit 12 may receive the first type data stream from streaming server 30 in response to the content request message. The first type data stream may be a data stream created based on the first protocol in streaming server 30. Furthermore, first stream receiving unit 12 may receive a first type data stream corresponding to a playback point included in the content request message. For example, the first protocol may be a FTP. The first type data stream may be a FTP data stream. Such FTP data stream may be encrypted with a key or include predetermined hidden data bits (i.e., watermark) for security purposes. Such security setting may be a digital right management (DRM). That is, first stream receiving unit 12 may receive a FTP data stream encrypted according to a certain DRM scheme and created from a predetermined playback point of the selected content.

Stream converting unit 13 may convert the received first type data stream to a second type data stream based on a second protocol. The second protocol may be a HTTP. The second stream may be a HLS stream that is not encrypted or does not include hidden data for security purposes. Particularly, stream converting unit 13 may segment the received first stream in a predetermined time unit, thereby generating a plurality of first stream files. After segmentation, stream converting unit 13 may remove/unset, or "release", a security setting of the plurality of first stream files. For example, stream converting unit 13 may decrypt the plurality of first stream files or eliminate hidden data from the plurality of first stream files. Stream converting unit 13 may generate the second stream files based on the plurality of first stream files with the security setting released.

As described above, stream converting unit 13 may release a security setting of the plurality of first stream files. Such operation may be performed through various methods. For example, when user equipment 10-1 receives a FTP data stream encrypted based on a certain DRM scheme from streaming server 30, stream converting unit 13 may divide the received FTP data stream into a plurality of FTP stream files by segmenting the FTP data stream in a unit of 10 seconds. Stream converting unit 13 may decrypt the plurality of first stream files based on the certain DRM scheme used for encrypting the FTP data stream. The present invention, however, is not limited thereto. When a watermark is hidden in the FTP data stream, stream converting unit 13 may eliminate such hidden watermark from the FTP stream files. Then, stream converting unit 13 may create a HLS stream based on the FTP stream files. The present invention, however, is not limited thereto.

Reproducing unit 14 may play back the selected contents by reproducing the second stream files generated in stream converting unit 13. That is, the selected contents may be reproduced based on the plurality of second stream files and the associated index files, which might be stored in database 15.

Database 15 may store the plurality of second stream files generated in the stream converting unit 13. Furthermore, database 15 may also store the index files associated with the plurality of second stream files. Hereinafter, operation of stream converting unit 13 will be described in more detail with reference to FIG. 3.

Figure 3:
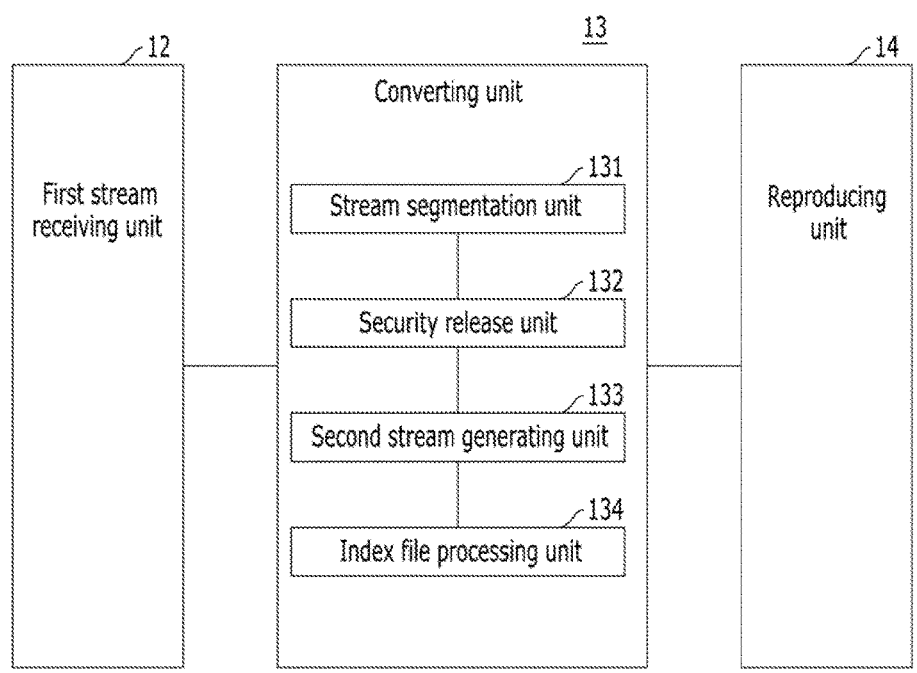
FIG. 3 shows a stream converting unit of FIG. 2 in accordance with at least one embodiment of the present invention.

FIG. 3 shows a stream converting unit of FIG. 2 in accordance with at least one embodiment of the present invention.

Referring to FIG. 3, stream converting unit 13 may include stream segmentation unit 131, security release unit 132, second stream generating unit 133, and index file processing unit 134.

Stream segmentation unit 131 may segment the received first type data stream in a predetermined time unit. Such a predetermined time unit may be determined based on a second protocol of a second type data stream. Here, the first type data stream may denote an unsupported data stream that might not be reproduced in user equipment 10-1. That is, the first type data stream may be an irreproducible data stream and/or incompatible in user equipment 10-1. The second type data stream may denote a supported stream that can be reproduced in user equipment 10-1. That is, the second type data stream may be reproducible and/or compatible in user equipment 10-1. For example, stream segmentation unit 131 may divide a FPT data stream in a unit of 10 seconds which may be a time unit for processing a HLS data stream. As a result of segmentation, stream segmentation unit 131 may generate a plurality of first stream files.

Security setting release unit 132 may release security setting of the plurality of the first stream files. For example, the security setting may be encryption or hiding data based on a certain DRM scheme. That is, the first type data stream may be encrypted or include hidden data (i.e., watermark) based on a predetermined DRM scheme. Security setting release unit 132 may release such DRM setting of the first stream files. Particularly, security setting release unit 132 may decrypt the first stream files or eliminate hidden data from the first stream files, but the present invention is not limited thereto.

Second stream file generating unit 133 may generate a plurality of second stream files based on the plurality of first stream files with the security setting released. The generated second stream files may be parts of a second type data stream which is a supported stream format of the first type data stream received from streaming server 30. For example, second stream file generating unit 133 may create HLS stream files based on the FTP stream files after releasing the DRM setting of the FTP stream files. The HLS stream files may be parts of a HLS stream which is a reproducible stream format of the FTP data stream received from streaming server 30.

Index file processing unit 134 may create an index file for the second stream files. The index file may be a play list format file that includes a reproducing order of the plurality of second stream files. For example, the index file may be created in a M3U8 format. That is, such index file in a M3U8 format may inform a user of a reproducing order of HLS stream files created by second file generating unit 133.

As described above, stream converting unit 13 may convert unsupported data stream to supported data stream in accordance with at least one embodiment of the present invention. That is, stream converting unit 13 may convert an irreproducible data stream into reproducible data stream. Stream converting unit 13 may employ various methods for converting one type of data stream into another type of data stream. The present invention is not limited to a certain conversion method. Hereinafter, operation of user equipment 10-1 will be described with reference to FIG. 4.

Figure 4:
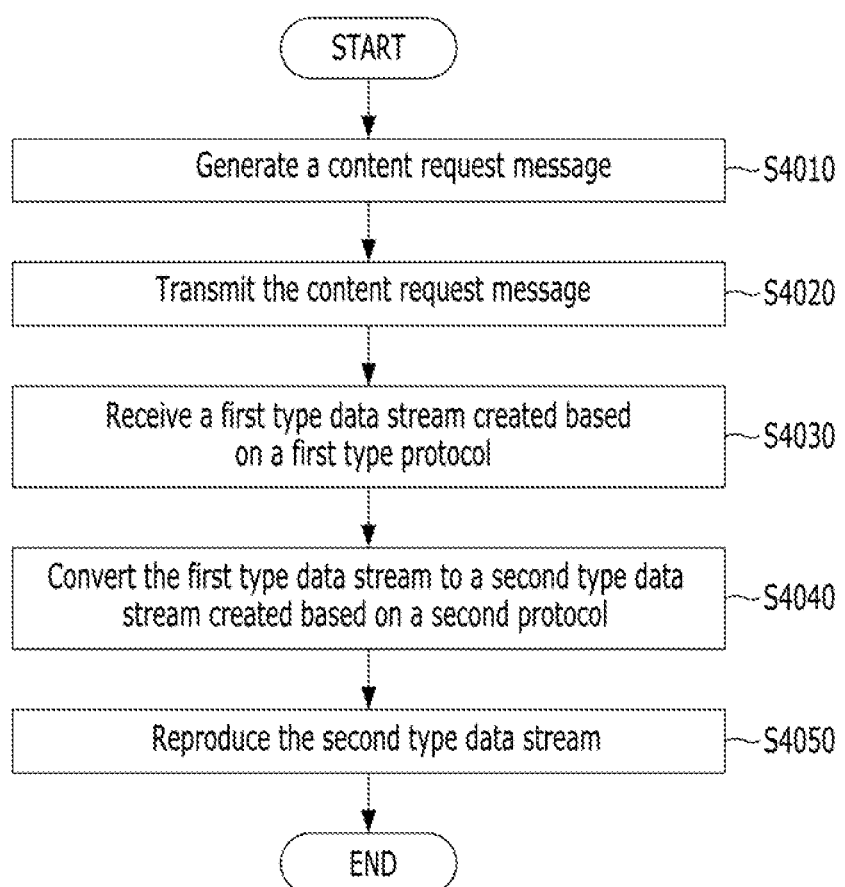
FIG. 4 shows operation of user equipment in accordance with at least one embodiment of the present invention.

FIG. 4 shows operation of user equipment in accordance with at least one embodiment of the present invention.

Referring to FIG. 4, a content request message may be generated at step S4010. For example, user equipment 10-1 may transmit a content request message to streaming server 30. Particularly, user equipment 10-1 may receive a list of contents stored in streaming server 30 and provide the received content list to a user through a certain user interface. User equipment 10-1 may receive a selection signal from the user for selecting at least one of contents in the list through the user equipment of user equipment 10-1. Upon the receipt of the selection signal, user equipment 10-1 may generate the content request message. The generated content request message may include a playback point of the selected content.

At step S4020, the generated content request message may be transmitted to a streaming server. For example, request message transmitting unit 11 of user equipment 10-1 may transmit the generated content request message to streaming server 30 through network 20.

At step S4030, a first type data stream may be received from the streaming server in response to the content request message. For example, streaming server 30 may generate the first type data stream based on a first type protocol and transmit the generated first type data stream to user equipment 10-1 in response to the content request message. First stream receiving unit 12 of user equipment 10-1 may receive the first type data stream from streaming server 30.

At step S4040, the received first type data stream may be converted into a second type data stream. For example, the first type data stream may not be supported for reproduction in user equipment 10-1. In this case, stream converting unit 13 may convert the received first type data stream to a second type data stream which is supported to be reproduced in user equipment 10-1. Such conversion operation is already described with reference to FIG. 2 and FIG. 3, the detailed description thereof is omitted.

At step S4050, the second type data stream may be reproduced. For example, reproducing unit 14 may play back the selected content by reproducing the second stream files generated in stream converting unit 13. Accordingly, although user equipment 10-1 receives the unsupported data stream from streaming server 30, user equipment 10-1 may reproduce the selected contents by converting the unsupported data stream to supported data stream without requesting streaming server 30 for retransmission of corresponding contents in supported format.

In accordance with another embodiment, request message transmitting unit 11 may receive a request of changing a playback point while reproducing unit 14 is playing back selected contents. Upon the receipt of the request, request message transmitting unit 11 may transmit a playback point change request message to streaming server 30 in order to request streaming server 30 to transmit first type data stream of the selected contents from the changed playback point. Hereinafter, operation of user equipment will be described with reference to FIG. 5.

Figure 5:
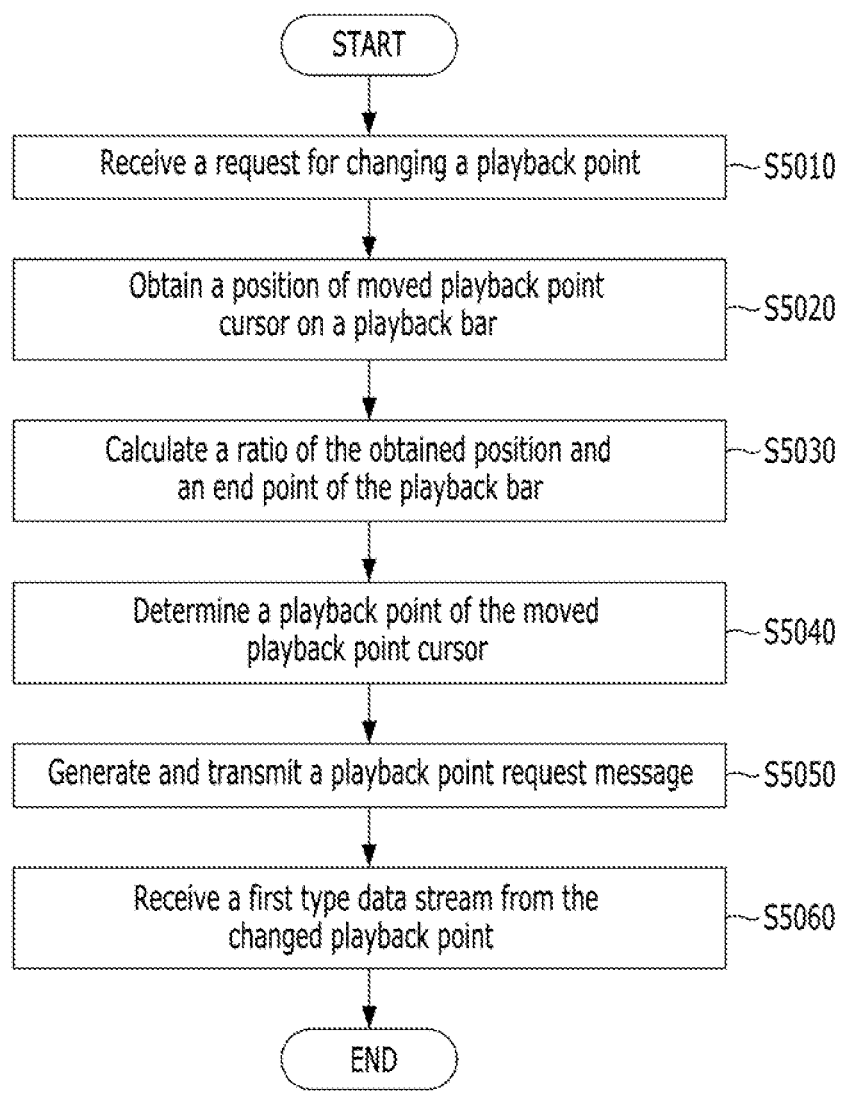
FIG. 5 shows operation of user equipment upon the receipt of request for changing a playback point while playing back selected contents in accordance with at least one embodiment of the present invention.

FIG. 5 shows operation of user equipment upon the receipt of request for changing a playback point while playing back selected contents in accordance with at least one embodiment of the present invention.

Referring to FIG. 5, a request for changing a playback point may be received at step S5010. For example, a user may want to watch a scene in the middle of a movie while playing back the movie from the beginning In this case, the user may control such a playback point by moving a playback point cursor on a playback bar. The playback point cursor and the playback bar may be provided within a graphic user interface for playing back multimedia contents, such as a media player. When the user moves the playback point cursor on the playback bar, user equipment 10-1 may indicate the receipt of the request for change a playback point.

At step S5020, a position of the moved playback point cursor on a playback bar may be obtained. For example, when the user change the playback point cursor on the playback bar, request message transmitting unit 11 may obtain a position of the playback point cursor on the playback bar.

At step S5030, a ratio of the obtained position and an end point of the playback bar may be calculated. For example, request message transmitting unit 11 may calculate a ratio of the obtained position and an end point of the playback bar.

At step S5040, a playback point of the moved playback point cursor may be determined based on the calculated ratio. For example, request message transmitting unit 11 may determine a playback point of the changed playback point cursor based on the calculated ratio.

At step S5050, a playback point change request message may be generated based on the determined playback point and transmitted to streaming server 30. For example, request message transmitting unit 11 may generate a playback point change request message based on the determined playback point. The generated playback point change request message may include information on the determined playback point of the moved playback point cursor. After generation, request message transmitting unit 11 may transmit the generated playback point change request message to streaming server 30.

At step S5060, first type data stream generated from the changed playback point of the selected contents may be received in response to the playback point change request message. For example, in response to the playback point change request message, first stream receiving unit 12 may receive first type data stream generated from the changed playback point of the selected contents and transmitted from streaming server 30.

After receiving the first type data stream, stream converting unit 13 may convert the received first type data stream into a second type data stream. As described above, the first type data stream may be created based on the first protocol and unsupported by user equipment 10-1. The second type data stream may be created based on the second protocol and supported by user equipment 10-1. That is, the second type data stream may be a reproducible data stream.

Particularly, segmentation unit 131 may divide the received first type data stream in a predetermined time unit that might be determined based on the second protocol. That is, segmentation unit 131 may generate a plurality of first stream files. Security setting release unit 132 may release security setting of the first stream files. Second stream generating unit 133 may generate a plurality of second stream files based on the first stream files with the security setting released. Index file processing unit 134 may update index files of the second stream files based on the process of the changed playback point. The second stream files may be included in the second stream which is reproducible and supported in user equipment 10-1. Reproducing unit 14 may play back the selected contents based on the plurality of second stream files and the associated index files, which are stored in database 15.

As descried above, streaming server 30 may receive a content request message and/or a playback point change request message from user equipment 10-1 and provide an associated streaming service in accordance with at least one embodiment of the present invention. Such operation and configuration of streaming server 30 will be described with reference to FIG. 6.

Figure 6:
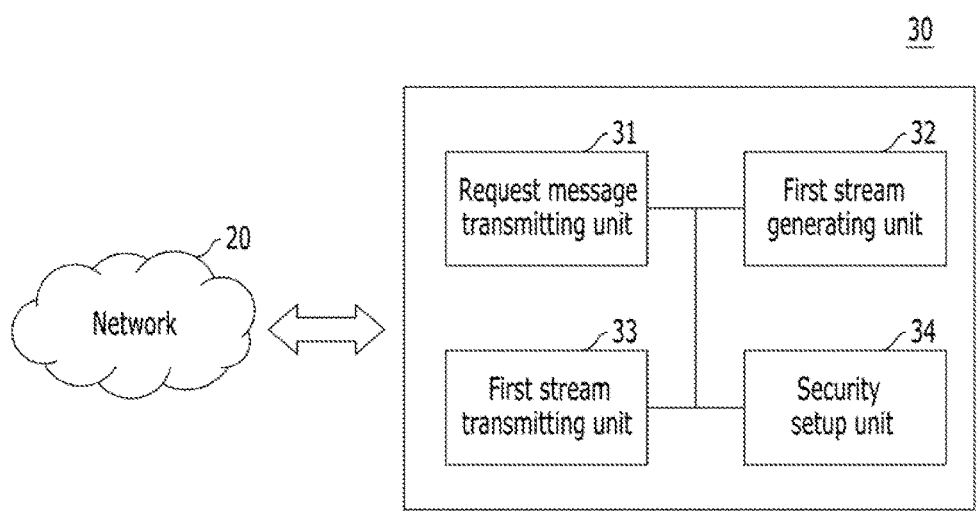
FIG. 6 shows a streaming server in accordance with at least one embodiment of the present invention.

FIG. 6 shows a streaming server in accordance with at least one embodiment of the present invention.

Referring to FIG. 6, streaming server 30 may include request message receiving unit 31, first stream generating unit 32, first streaming transmitting unit 33, and security setup unit 34. Request message receiving unit 31 may receive a content request message and/or a playback point change request message from user equipment 10. The content request message may be for requesting a streaming service of certain contents that might be selected by a related user through user equipment 10. The playback point change request message may be for requesting transmitting a data stream of certain contents from a changed playback point.

First stream generating unit 32 may generate a first type data stream of predetermined contents based on a first protocol in response to at least one of the content request message and the playback point change request message. For example, first stream generating unit 32 may generate a first type data stream from beginning of the predetermined contents based on information on a playback point, which is included in the content request message. Furthermore, first stream generating unit 32 may generate a first type data stream from a certain middle point of the predetermined contents based on information on a changed playback point which is included in the playback point change request message.

First stream transmitting unit 33 may transmit the generated first type data stream to user equipment 10. First stream transmitting unit 33 may transmit the generated first type data stream based on the first protocol that is used to create the first type data stream. Such a first type data stream may be unsupported by user equipment 10-1. In this case, user equipment 10-1 may convert the first type data stream into a second stream created in a supported format. After conversion, user equipment 10-1 may play back the predetermined contents by reproducing the second type data stream converted from the received first type data stream.

Security setup unit 34 may set security settings of the first type data stream and/or the contents selected by a related user. For example, security setup unit 34 may encrypt the generated first type data stream or hide data bits (watermark) in the generated first type data stream based on a certain DRM scheme, but the present invention is not limited thereto. Security setting may be set up through various methods.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in the application, the word "exemplary" is used herein to mean serving as an example, instance, or illustration. Any aspect or design described herein as "exemplary" is not necessarily to be construed as preferred or advantageous over other aspect or designs. Rather, use of the word exemplary is intended to present concepts in a concise fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a controlling unit, a controlling unit, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose controlling unit, the program code segments combine with the controlling unit to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

No claim element herein is to be construed under the provisions of 35 U.S.C. § 112, sixth paragraph, unless the element is expressly recited using the phrase "means for" or "step for."

Although embodiments of the present invention have been described herein, it should be understood that the foregoing embodiments and advantages are merely examples and are not to be construed as limiting the present invention or the scope of the claims. Numerous other modifications and embodiments can be devised by those skilled in the art that will fall within the spirit and scope of the principles of this disclosure, and the present teaching can also be readily applied to other types of apparatuses. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. User equipment for conversion of a unsupported data stream to a supported data stream, the user equipment comprising:
at least one hardware processor that executes:
a request message transmitting unit configured to transmit a content request message to a streaming server in order to request a predetermined content stored in the streaming server;
a first stream receiving unit configured to receive, from the streaming server in response to the content request message, a unsupported data stream created from the requested content based on a unsupported protocol by the streaming server, wherein the unsupported data stream and the unsupported protocol are unsupported by the user equipment for reproducing the requested content;
a converting unit configured to convert the received unsupported data stream to a supported data stream that is supported by the user equipment to reproduce the content of the unsupported data stream, by (i) determining a time unit used to process the supported data stream based on the supported protocol, (ii) segmenting the received unsupported data stream into a plurality of unsupported stream files using the determined time unit, and (iii) converting the plurality of unsupported stream files to a plurality of supported stream files, wherein the supported data stream and the supported protocol are supported by the user equipment for reproducing a content of the supported data stream, and the time unit is determined based on a protocol type of the supported protocol; and
a reproducing unit configured to reproduce the requested content by processing the plurality of supported stream files; and
at least one memory which stores program instructions required to perform at least one of a transmission of the content request message, a reception of the unsupported data stream, a conversion of the received unsupported data stream, and a reproduction of the requested content, and is configured to provide the program instructions to the at least one hardware processor.

2. The user equipment of claim 1, wherein the converting unit further includes:
a security setting release unit configured to release security setting of the plurality of the unsupported stream files; and
a second stream file generating unit configured to generate a plurality of supported stream files based on the plurality of unsupported stream files with the security setting released,
wherein the supported stream files are included in the supported data stream.

3. The user equipment of claim 2, further comprising:
a database configured to store the plurality of supported stream files,
wherein the reproducing unit is configured to reproduce the requested contents based on the plurality of supported stream files stored in the database.

4. The user equipment of claim 2, wherein:
the converting unit further includes an index file processing unit configured to generate an index file of the plurality of supported stream files;
the user equipment further comprises a database configured to store the plurality of supported stream files and the index file; and
the reproducing unit is configured to reproduce the requested content based on the plurality of supported stream files and the index file stored in the data base.

5. The user equipment of claim 4, wherein the index file includes a reproducing order of the plurality of supported stream files.

6. The user equipment of claim 1, wherein:
the request message transmitting unit is configured to transmit to the streaming server the content request message including information on a playback point of the requested content; and
the first stream receiving unit is configured to receive from the streaming server the first type data stream corresponding to the playback point included in the content request message.

7. The user equipment of claim 1, wherein:
the request message transmitting unit is configured i) to receive a user input for changing a playback point from a user through a user interface while reproducing the requested content through the reproducing unit and ii) to transmit a playback point change request message to the streaming server to request the streaming server to transmit the unsupported data stream from a changed playback point;
the first stream receiving unit is configured to receive from the streaming server the unsupported data stream from the changed playback point; and
the converting unit is configured to convert the received unsupported data stream to the supported data stream.

8. The user equipment of claim 7, wherein:
the converting unit includes:
a segmentation unit configured to determine a time unit used to process the supported stream files based on the supported protocol, generate a plurality of unsupported stream files by segmenting the received unsupported data stream by the determined time unit,
a security setting release unit configured to release a security setting of the plurality of unsupported stream files,
a second stream file generating unit configured to generate a plurality of supported stream files based on the plurality of unsupported stream files with the security setting released, and
an index file processing unit configured to update an index file of the plurality of supported stream files based on the changed playback point;
the supported stream files are included in the supported data stream; and
the reproducing unit is configured to reproduce the requested content based on the plurality of supported stream files and the updated index file, which are stored in the database.

9. The user equipment of claim 7, wherein the request message transmitting unit is configured to:

obtain a position of a playback point cursor on a playback bar upon the receipt of the user input for moving the playback point cursor through a user interface while reproducing the requested content through the reproducing unit;

calculate a ratio of the obtained position and an end point of the playback bar;

determine a playback point of the moved playback point cursor based on the calculated ratio;

generate the playback point change request message based on the determined playback point; and transmit the generated playback point change request message to the streaming server.

10. The user equipment of claim 1, wherein:

the unsupported protocol is a file transfer protocol (FTP), unsupported data stream is a FTP stream;

the supported protocol is a hypertext transfer protocol (HTTP), the supported data stream is a HTTP live streaming (HLS) data stream; and the FTP stream is segmented into a plurality of FTP files by a time unit used to process the HLS data stream based on the HTTP.

11. The user equipment of claim 1, wherein the request message transmitting unit is configured to transmit a content request message to request a unsupported data stream created from the requested content based on a unsupported protocol.

12. The user equipment of claim 1, wherein the request message transmitting unit is configured to transmit the content request message when receiving a user selection input for selecting the requested content through a user interface.

13. The user equipment of claim 1, wherein the unsupported data stream is a data stream processed based on a predetermined security scheme and the supported data stream is a data stream not processed based on the predetermined security scheme.

14. The user equipment of claim 13, wherein the predetermined security scheme is at least one of digital right management (DRM) schemes.

15. A method of converting a unsupported data stream to a supported data stream in a user equipment, the method comprising:

generating a content request message to request a content;

transmitting the generated content request message to a streaming server;

receiving from the streaming server a unsupported data stream generated from the requested content based on a unsupported protocol;

determining a time unit used to process a supported data stream based on a supported protocol;

segmenting the received unsupported data stream into a plurality of unsupported stream files using the determined time unit, converting the received unsupported data stream to the supported data stream by converting the plurality of unsupported stream files to a plurality of supported stream files based on the supported protocol; and reproducing the requested content based on the supported data stream, wherein the segmenting includes generating the plurality of unsupported stream files by segmenting the received unsupported data stream based on the time unit that is determined based on a protocol type of the supported protocol.

16. The method of claim 15, wherein the converting further includes:

releasing a security setting of the plurality of the unsupported stream files; and generating the plurality of supported stream files based on the plurality of unsupported stream files with the security setting released, wherein the supported stream files are included in the supported data stream.

17. The method of claim 16, wherein:

the unsupported protocol is a file transfer protocol (FTP) and the unsupported data stream is a FTP stream; and the supported protocol is a hypertext transfer protocol (HTTP) and the supported data stream is a HTTP live streaming (HLS) data stream.

18. A streaming server for transmitting a data stream of a requested content to a user equipment, the streaming server comprising:

a request message receiving unit configured to receive a content request message from a user equipment;

a first stream generating unit configured to generate a first type data stream from requested content of the content request message based on a first protocol, wherein the first type data stream and the first protocol are a unsupportable data stream and a unsupportable protocol by the user equipment; and a first stream transmitting unit configured to transmit the generated first type data stream to the user equipment, wherein the user equipment (i) receives the first type data stream from the streaming server, determines a time unit used to process a second type data stream based on a second protocol, (ii) segments the received first type data stream into a plurality of first type stream files using the determined time unit, (iii) converts the received first type data stream to the second type data stream by converting the plurality of first type stream files to a plurality of second type stream files based on the second protocol, and (iv) reproduces the requested content based on the second type data stream, and the second type data stream and the second protocol are supportable by the user equipment; and wherein the time unit is determined based on a protocol type of the second protocol.

19. The streaming server of claim 18, further comprising:

a security setup unit configured to process at least one of the requested content and the first type data stream according to a predetermined security scheme.

20. The streaming server of claim 18, wherein:

the request message receiving unit is configured to receive a playback point change request message from the user equipment, wherein the playback point change request message includes information on a playback point; and the first stream generating unit is configured to generate the first type data stream based on the information on the playback point included in the playback point change request message.

* * * * *